Dec. 8, 1964  B. C. MILLER ETAL  3,160,005
MULTI-STING MACH NUMBER SENSOR
Filed Aug. 24, 1961

*INVENTORS.*
BOB C. MILLER
EDWARD L. GRAHAM, JR
JERRY D. WALTER

United States Patent Office 3,160,005
Patented Dec. 8, 1964

3,160,005
MULTI-STING MACH NUMBER SENSOR
Bob C. Miller, West Palm Beach, Fla., Edward L. Graham, Jr., Camden, S.C., and Jerry D. Walter, North Palm Beach, Fla., assignors, by mesne assignments, to the United States of America as represented by the Secretary of the Navy
Filed Aug. 24, 1961, Ser. No. 133,749
4 Claims. (Cl. 73—181)

The present invention relates to a device for determining the velocity of a compressible fluid flowing past the device and more particularly to a device for determining the half angle of the shock wave created by the device when the compressible fluid velocity is in the supersonic region.

In the field of compressible fluid flow, it has been the general practice to utilize a device to determine the total pressure head and the ambient static pressure of a fluid and from these values to compute the velocity of the compressible fluid. Although such devices are adequate for compressible fluid flow in the subsonic region, at supersonic velocities a shock forms ahead of any body in the line of flow. Due to the compressible effects and shock phenomena at supersonic velocities the total head pressure tube of a conventional indicator indicates a total pressure value considerably below the true value and the static pressure orifices do not provide a true ambient static pressure reading. In the field of supersonic flow it has been the practice to create a shock wave and to position an open ended tube at the shock wave to determine the half-angle thereof. Since the relative velocity of the free fluid stream is related to the half-angle of the shock wave, the velocity of the free compressible stream may then be determined. Such a device, however, necessitates some means, such, for example, as a reversible motor, to move the tube forwardly and rearwardly through the shock wave to sense the higher and lower pressures across the shock wave and thus sense or locate the position of the shock wave. Such a system further requires some means to maintain the device at a zero angle of attack to the compressible fluid flow to eliminate errors which result from changes in the angle of attack of the device with the fluid flow.

In the field of supersonic fluid flow it is generally desirable to determine the Mach number of the flow, that is, the ratio of local velocity of the flow to the local velocity of sound, and the true or indicated fluid speed is of little or no significance. Therefore, it is the primary object of those concerned with supersonic fluid flow to accurately determine the Mach number of such a flow. The general purpose of this invention, therefore, is to provide a device for accurately determining the Mach number of the free fluid flow by a simple device which does not necessitate the use of servo motors or the like and which does not necessitate any means for maintaining the device at a zero angle of attack to the fluid stream. To attain this, the present invention contemplates a plurality of spatially arranged small-angle cones to create a plurality of shock waves and means on a centrally located cone to determine the position of the shock waves created by the other cones from which the Mach number of the free fluid stream may be determined.

It is, therefore, an object of the invention to provide a new and improved device for determining the half-angle of the shock wave created by a perturbation in a supersonic flow.

Another object is to provide a device for determining the half-angle of a shock wave created by a perturbation in a supersonic flow that is insensitive to the angle of attack.

A further object is the provision of a device for determining the half-angle of a shock wave created by a perturbation in a supersonic flow that may be readily adapted for use in a wind tunnel or the like, or may be used on an airborne craft or missile which is in supersonic flight.

Still another object is to provide a device for determining the Mach angle without the use of relatively movable parts.

Other objects and many of the attendant advantages of this invention will be more readily appreciated as the same becomes better understood by reference to the following detailed description when considered in connection with the accompanying drawing in which like reference characters designate like parts throughout the several figures thereof and wherein.

Figure 1:
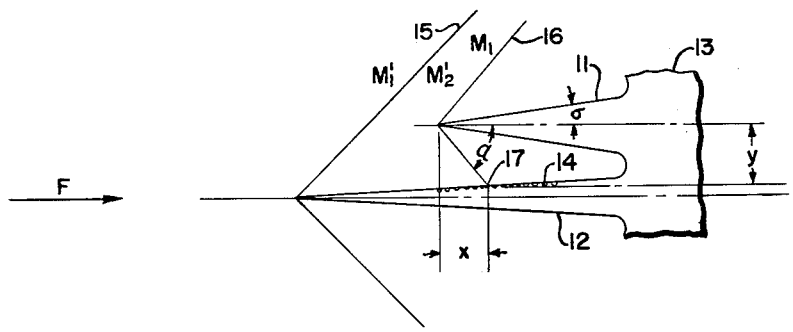
FIG. 1 illustrates a preferred embodiment of the invention that may be used when the device is maintained at a zero attack angle with the supersonic flow.

There is illustrated in FIG. 1 a pair of small angled cones 11 and 12 having a fixed spatial relationship between the axes thereof. The probes may be fixed to the leading edge of the wing 13 of an aircraft, to the nose of a missile, or may be located in fixed spatial relation in a supersonic wind tunnel.

Probe 12 has a plurality of pressure sensitive means 14 along the side adjacent the probe 11. The pressure sensing means 14 are closely spaced and may be of any type capable of sensing fluid pressure thereon, such, for example, as a plurality of holes individually connected to a like plurality of pressure gages or a plurality of pressure to electrical transducers individually connected to suitable indicating means.

As indicated in FIG. 1, the device is positioned in a compressible fluid flowing in the direction indicated by the arrow F and having a zero angle of attack thereto, it being understood that the flow may result from the fluid flowing past the stationary device or the device flowing through the compressible fluid. If the fluid flow is in the supersonic region, a shock wave 15 will be created by the vertex of cone 12, and a second shock wave 16 will be created by the vertex of cone 11. Since the probe 11 is shorter than the probe 12, the shock wave 16 created by probe 11 will intersect probe 12 as indicated at 17. Since the pressure behind the shock wave 16 is higher than the pressure in front of the shock wave, the pressure indicators 14 located behind the shock wave will indicate a higher pressure than those located in front of the shock wave 16 and therefore the point at which the shock wave 16 intersects the probe 12 is accurately known.

For a cone having a relatively small semi-vertex angle $\sigma$ positioned at a zero angle of attack to a supersonic flow, the shock wave created thereby will itself be conical in shape having its axis and vertex coincident with the axis and vertex, respectively, of the cone. Since the distance $y$ from each pressure sensing element 14 to the axis of cone 11 and the distance $x$ along the axis of cone 11 from the vertex thereof to each individual pressure sensitive element 14 are each accurately known and fixed; and since the pressure differential across the shock wave 16 will accurately locate the shock wave intersection with probe 12, the half-angle $\alpha$ of the shock wave, or the so-called Mach angle, may be computed.

Mach number $M_1$ is a function of the Mach angle $\alpha$ and the semi-vertex angle $\sigma$ and since $\sigma$ and $\alpha$ are known, Mach number $M_1$ may be computed. The free stream Mach number $M_1'$ is a function of the Mach number $M_2'$ behind the shock wave 15, and since $M_1$ equals $M_2'$, the free stream Mach number may also be computed.

For $\sigma \to 0$, the relationship between $\alpha$ and $M_1$, is simply:

$$\alpha = \sin^{-1} \frac{1}{M_1}$$

or $$M_1 = \frac{1}{\sin \alpha}$$

(G. I. Taylor and J. W. Maccoll, "The Air Pressure on a Cone Moving at High Speed," Proc. Roy. Soc. (A) vol. 139 (1933) p. 278). That is, the conical shock wave angle on the body approaches the Mach angle. In general, the solution for the supersonic flow over a cone must be obtained empirically. This was first done by Taylor and Maccoll and recorded in the above publication. Kopal has prepared extensive tables of numerical results in which $M_1$ is given as a function of $\alpha$ for various cone half angles $\sigma$. (F. Kopal, "Tables of Supersonic Flow Around Cones," MIT Center of Analysis, Tech Report No. 1, MIT, 1947). For small cone half angles, the above equation provides a satisfactory solution.

If the actual cone is made sufficiently slender, $M_1$ can be made to approach $M_1'$ to any desired degree. To correct for the difference between $M_1$ and $M_1'$, the first step would be to assume that $M_1$ is the same as the Mach number on the surface of the cone 12, (i.e. $M_1 = M_{1s}$). Kopal, in the above publication, tabulates the relationship between $M_{1s}$ and $M_1'$ as a function of the cone half angle $\sigma$. Kopal's tables indicate that $M_1'$ will exceed $M_{1s}$ by a factor of approximately 10% for a cone half angle of 10°. This is a relatively blunt cone. For a slender cone as proposed herein, $M_1'$ will be approximately equal to $M_{1s}$ and the difference as indicated in Kopal's tables compensated for in calibrating the indicators.

Figure 2:
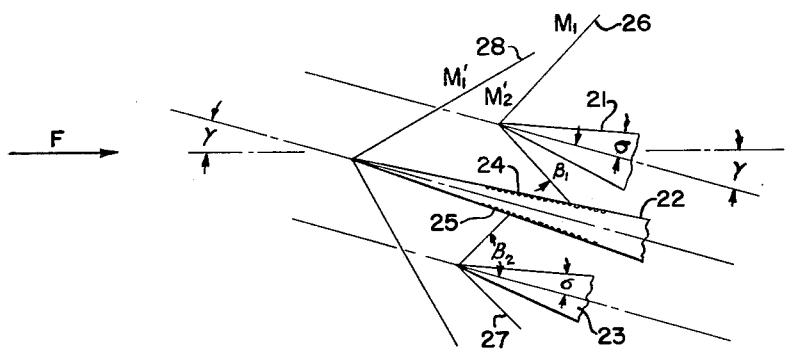
FIG. 2 illustrates another embodiment of the invention which is insensitive to angle of attack in a single plane.

Referring now to FIG. 2 there is illustrated a second embodiment of the device arranged in such a manner as to be insensitive to the angle of attack in a single plane. The device is illustrated as having an angle of attack $\gamma$ to the supersonic fluid flow F and comprises a plurality of cones 21, 22 and 23. Cones 21 and 23 are spatially arranged on opposite sides respectively of cone 22 and have their axes in a common plane with the axis of cone 22. On opposite sides of cone 22 are a plurality of pressure sensing elements 24–25, elements 24 being arranged to sense the shock wave 26 created by cone 21 and elements 25 being arranged to sense the shock wave 27 created by the cone 23. Since the position of each of the pressure sensitive elements 24 and 25 is accurately known with respect to the vertex of cones 21 and 23, respectively, the angles $\beta_1$ and $\beta_2$ may be accurately determined in the same manner as hereinbefore described in the analysis of FIG. 1.

If the semi-vertex angle $\sigma$ of cones 21 and 23 is equal the total angle of shock waves 26 and 27 will be equal since cones 21 and 23 are positioned within a common supersonic flow. Since the axis of cone 21 is parallel to the axis of cone 23, each of the cones has a common angle of attack $\gamma$ to the fluid flow and the sum of angles $\beta_1$ and $\beta_2$ is equal to the total shock wave angle of shock wave 26 and 27 which are equal.

One-half the sum of angles $\beta_1$ and $\beta_2$ equals the Mach angle $\alpha$ and since the semi-vertex angle $\sigma$ is known and fixed, the Mach number $M_1$ on the upstream side of shock wave 26 may be computed. From the relationship between the Mach number ahead and behind a shock wave, the Mach number $M_1'$ on the free stream side of shock wave 28 may be calculated.

Figure 3:
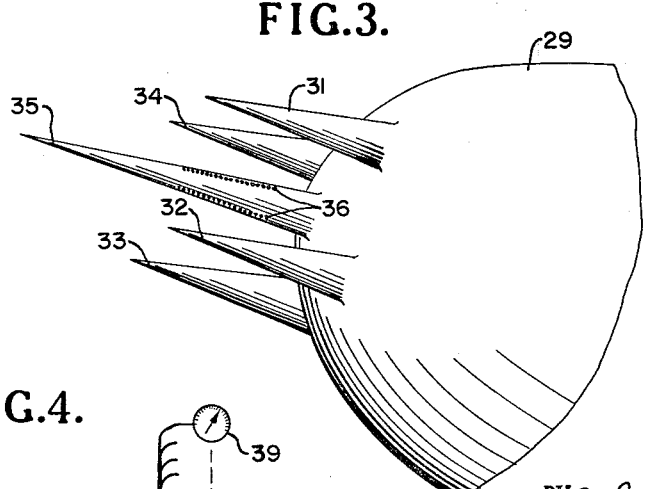
FIG. 3 illustrates a pictorial view of the nose of an aircraft, a missile, or the like, embodying another form of the present invention that is insensitive to angle of attack.

Referring now to FIG. 3 there is illustrated a portion of an aircraft, missile or the like, such, for example, as the nose portion 29 thereof. Supported by the craft 29 are a plurality of conically shaped probes 31, 32, 33 and 34 radially and quadrately spaced about a pressure sensing probe 35. The semi-vertex angle of the probes 31, 32, 33 and 34 are equal one to the other and the axes of the probes are respectively parallel one to the other and respectively parallel to the axis of probe 35. Supported within probe 35 at the surface thereof are four groups of longitudinal, closely spaced pressure sensing elements 36. The groups of sensing elements 36 are quadrately spaced about the probe 35 and respectively lie in the planes of intersection between the axis of probe 35 and the axis of each of the probes 31, 32, 33 and 34.

It will be obvious to one skilled in the art, that since the semi-vertex angles of the probes are equal, the angle of the shock wave created by each of the probes will be equal. The arrangement illustrated in FIG. 3 will provide sufficient data whereby the half-angle of the shock wave created by either of the probes 31, 32, 33 or 34 may be computed and from this the Mach number in the free stream may also be determined. It is further obvious that this arrangement is insensitive to angle of attack in either the yaw or pitch direction.

Figure 4:
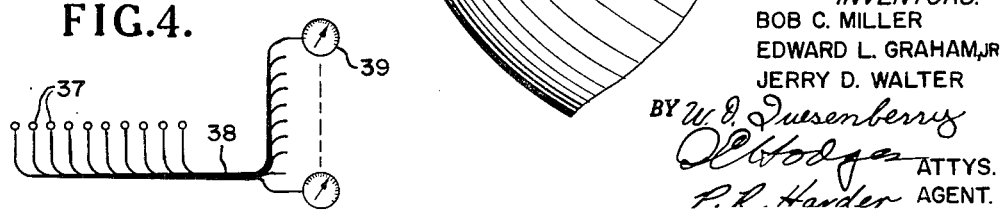
FIG. 4 is a circuit diagram suitable for use with the present invention.

Referring now to FIG. 4, there is illustrated a plurality of pressure to electrical transducers 37 which may be utilized as the pressure sensing means in any of the foregoing embodiments. Each of the elements 37 is respectively connected by way of electrical conducting cable 38 to a pressure indicator 39. As has been hereinbefore set forth, the pressure behind a shock wave is lower than the pressure in front of a shock wave, therefore, the transducers 37 located on one side of the shock wave will indicate a higher pressure than those located on the other side thereof. Since each transducer 37 is connected to a different indicator 39 it is possible to determine the exact location of the shock wave along the transducers 37 by an inspection of the indicators 39.

It is to be understood that, if desired, the pressure sensing system may be a plurality of orifices connected individually to a plurality of pressure gages or it may comprise another system suitable for the purpose.

It is obvious to one skilled in the art, that since the semi-vertex angle $\sigma$ of the probe creating the shock wave is fixed, the free stream Mach number $M_1'$ is a function of the Mach angle $\alpha$ and that, therefore, the free stream Mach number $M_1'$ is a function of the intersection of the shock wave along the probe, such intersection being indicated by the indicating devices. Therefore, the pressure differential along the sensing element may indicate directly the free stream Mach number $M_1'$.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. A device for determining the half-angle of a shock wave created by perturbation in a supersonic compressible fluid flow comprising a first conically shaped probe having a small semi-vertex angle positioned in the supersonic stream for creating a shock wave, a second conically shaped probe positioned in fixed spatial relation to said first probe, said second probe having its vertex extending beyond the vertex of said first probe and having its axis parallel to the axis of said first probe, a plurality of closely spaced pressure sensing elements along said second probe on the side adjacent said first probe, the position of each element being accurately known with respect to the vertex of said first probe, and means connected to said pressure sensing elements for indicating the position of the intersection of the shock wave with said second probe whereby the half-angle of the shock wave may be determined.

2. A device for determining the half-angle of a shock wave created by a perturbation in a supersonic compressible fluid stream comprising a first conically shaped probe positioned in the supersonic stream, a plurality of longitudinal closely spaced pressure sensing elements along opposite sides of said probe, a second conically shaped probe having a small semi-vertex angle positioned in the supersonic stream for creating a shock wave, said second probe having its vertex in known fixed relation with said plurality of sensing elements along one side of said first probe and its axis parallel to the axis of said first probe, a third conically shaped probe having a small semi-vertex angle positioned in the supersonic stream for creating a second shock wave, said third probe having its vertex in known fixed relation with said plurality of sensing elements along the other side of said first probe and its axis parallel to the axis of said first probe, and means connected to each of said sensing elements for indicating the position of the intersection of the shock waves created by said second and third probes with said first probe whereby the half-angle of each of the shock waves may be accurately determined.

3. A device for determining the half-angle of a shock wave created by a perturbation in a supersonic compressible fluid flow comprising a first conically shaped probe positioned in the supersonic stream, a plurality of conically shaped probes positioned in fixed radial relation about said first probe, the semi-vertex angle of each of said plurality of conically shaped probes being equal one to the other and the axis of each of said plurality of conically shaped probes being parallel to the axis of said first probe, a plurality of pressure sensing elements supported by said first probe, said plurality of sensing elements being divided into groups of longitudinal closely spaced elements, the number of groups of said elements corresponding to the number of said plurality of conically shaped probes, different ones of said groups lying in a plane connecting the axis of different ones of said plurality of probes with the axis of said first probe, the position of each pressure sensing element in each of said groups being accurately known with respect to the vertex of the associated plurality of cones, and means connected to each of said elements for indicating the position of the intersection of the shock wave created by each of said plurality of cones with said first probe whereby the half-angle of each of the shock waves may be accurately determined.

4. A device for determining the half-angle of a shock wave created by a perturbation in a supersonic compressible fluid stream comprising a first conically shaped probe supported in the supersonic stream; a first, second, third, and fourth plurality of longitudinal closely spaced pressure sensing elements supported in quadrature relationship on the surface of said first probe; a second, third, fourth, and fifth conically shaped probe supported in fixed quadrature relationship about said first probe; each of said second, third, fourth and fifth probe having a small semi-vertex angle equal one to the other and having their axes parallel one with the other and respectively parallel to the axis of said first probe; said first, second, third and fourth groups of sensing elements, lying, respectively, in a plane intersecting the axes of said first probe and said second, third, fourth and fifth probes; the position of each pressure sensing element within said groups being fixed in predetermined spaced relation with respect to the vertex of the cone lying in the plane of intersection, and means connected to each of said elements for indicating the position of the intersection of the shock wave created by the said second, third, fourth and fifth conically shaped probes with said first conically shaped probe whereby the half-angle of the shock wave created by said second, third, fourth and fifth conically shaped probe may be accurately determined.

References Cited in the file of this patent
UNITED STATES PATENTS

| | | |
|---|---|---|
| 2,512,790 | Cleveland | June 27, 1950 |
| 2,551,470 | Smith | May 1, 1951 |
| 2,829,490 | Kresse | Apr. 8, 1958 |
| 2,937,808 | Newell | May 24, 1960 |
| 2,969,939 | Sulken et al. | Jan. 31, 1961 |